United States Patent
Gomez et al.

[11] Patent Number: 5,884,195
[45] Date of Patent: Mar. 16, 1999

[54] GROUNDING ASSEMBLY FOR PROGRAMMING CELLULAR TELEPHONES

[75] Inventors: Francisco X. Gomez, Melrose Park; Roger K. Fisher, Ivanhoe; Jose De Jesus Marin; Jorge Sierra Lira, both of Addison, all of Ill.; Howard M. Tibbetts, Tewksbury, Mass.

[73] Assignee: Andrew Corporation

[21] Appl. No.: 818,129

[22] Filed: Mar. 14, 1997

[51] Int. Cl.⁶ .......................... H04M 11/00; H04M 3/22
[52] U.S. Cl. ................................... 455/572; 455/551
[58] Field of Search .................................... 455/551, 521, 455/572, 575, 418, 423, 90, 351, 67.1, 67.4

[56] References Cited

U.S. PATENT DOCUMENTS

| | | | |
|---|---|---|---|
| 5,155,860 | 10/1992 | McClure | 455/418 |
| 5,297,191 | 3/1994 | Gerszberg | 455/551 |
| 5,485,505 | 1/1996 | Norman et al. | 455/551 |
| 5,491,740 | 2/1996 | Ellis et al. | 455/551 |
| 5,657,371 | 8/1997 | Suomi et al. | 455/418 |

*Primary Examiner*—Thanh Cong Le
*Assistant Examiner*—Duc Nguyen
*Attorney, Agent, or Firm*—Lockwood, Alex, FitzGibbon & Cummings

[57] ABSTRACT

A grounding assembly is provided for a cellular telephone and is integrated into a battery modules for the cellular telephone. The assembly permits a user to manually access the manual test pin of the telephone body portion from the exterior without necessitating removal of the battery module from the cellular telephone body portion. The grounding assembly provides a means for contacting the manual test pin by grounding it to the battery by way of a plunger pin, which after contacting the manual test pin, switches the operation of the cellular telephone into a test mode for reading or programming the parameters in its number assignment module ("NAM").

21 Claims, 3 Drawing Sheets

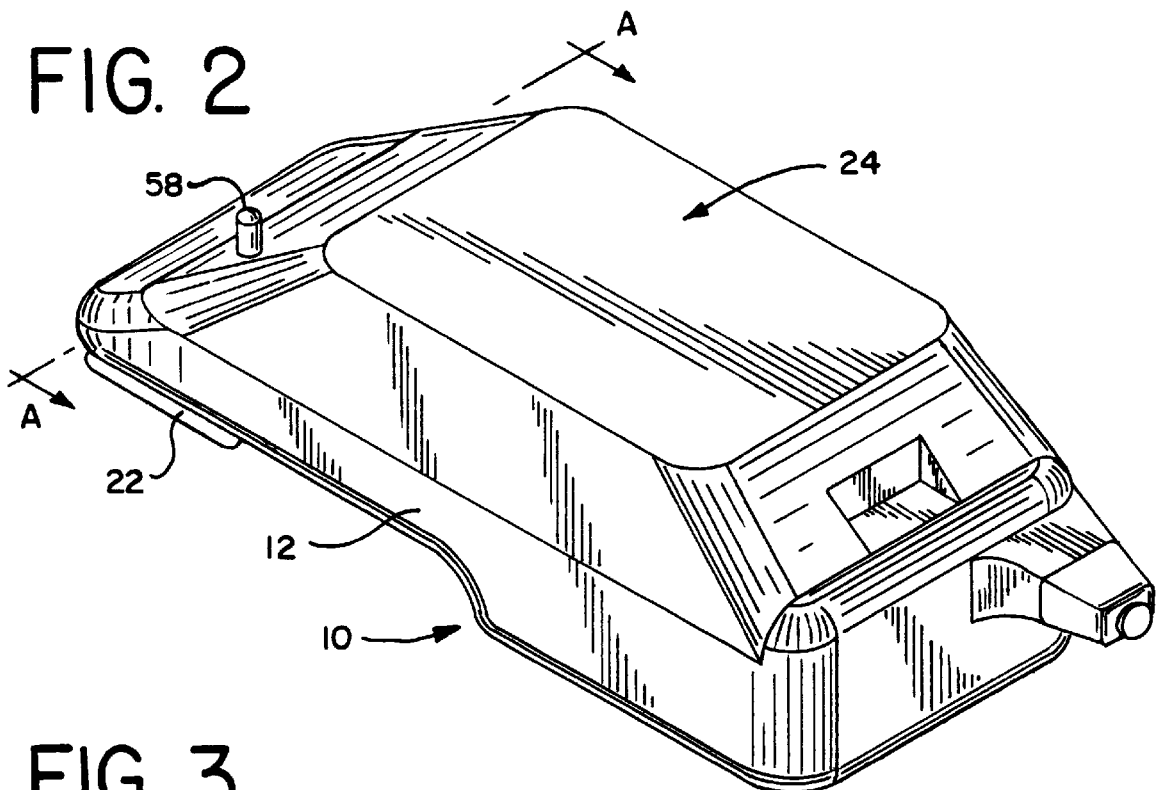
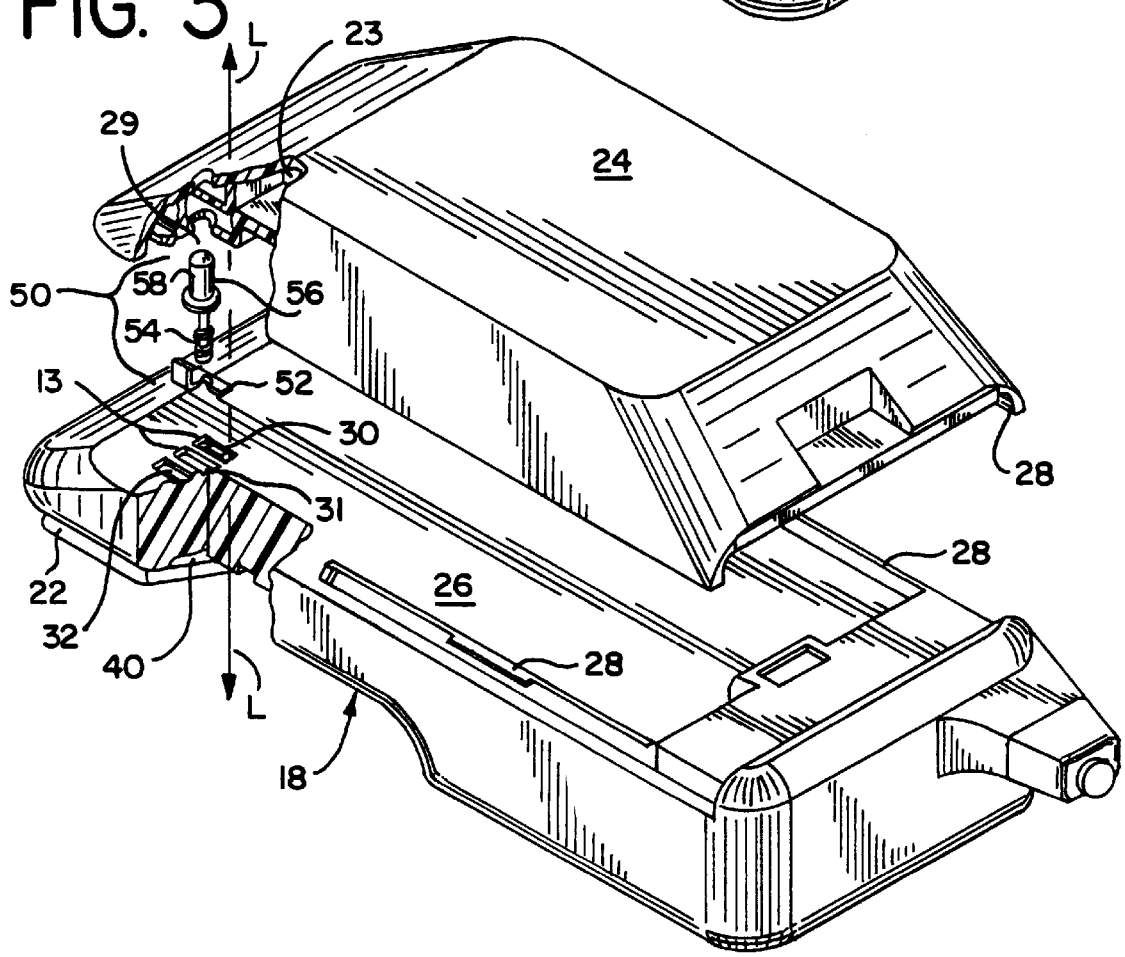

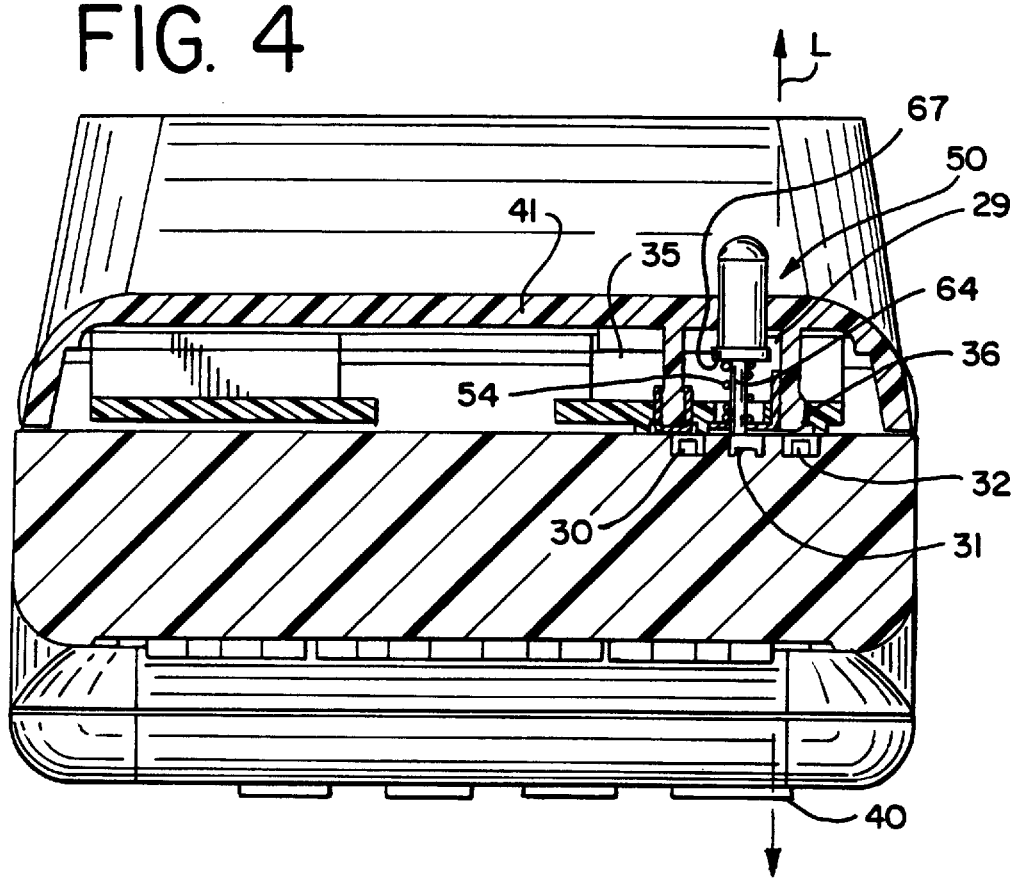
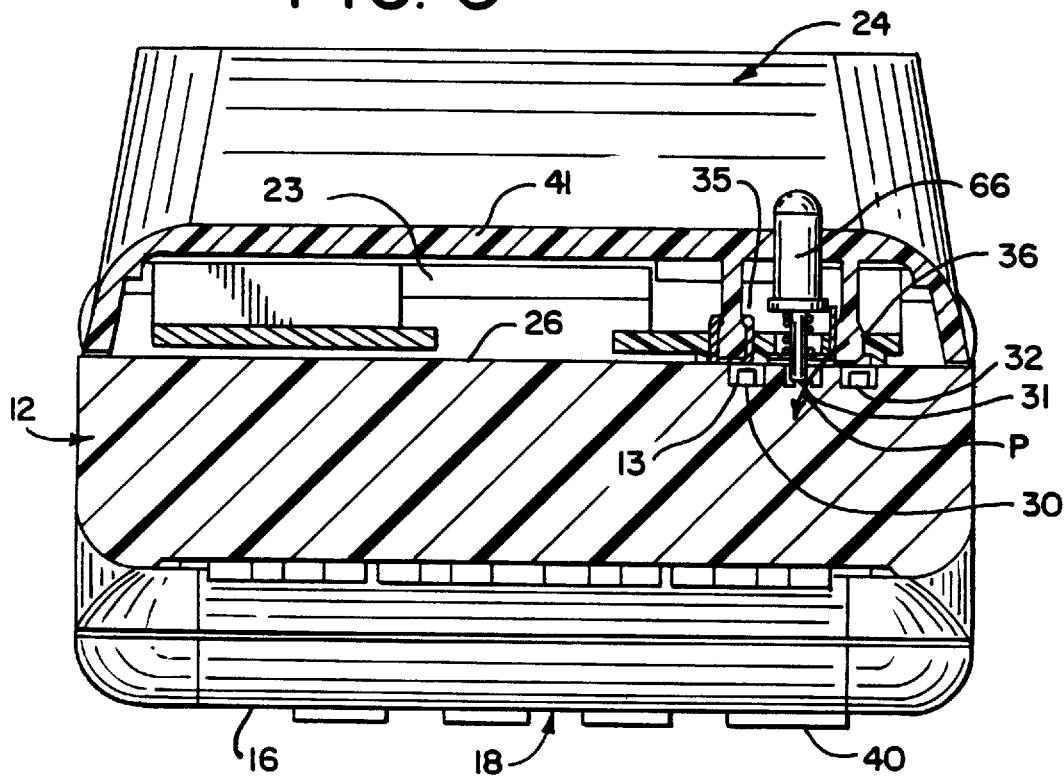

GROUNDING ASSEMBLY FOR PROGRAMMING CELLULAR TELEPHONES

BACKGROUND OF THE INVENTION

The present invention relates generally to portable, cellular telephones and more specifically relates to grounding assemblies for such telephones that are operable to place the telephones into test modes.

The popularity and low cost of portable cellular telephones has increased tremendously in the past few years. Technology advances have reduced the size and cost of such telephones. One popular model of a portable cellular telephone is manufactured by Motorola, Inc. of Schaumburg, Ill. and sold under the trade names "Micro-Tac" and "Tele-Tac". The former is generically referred to by the public as a "flip-phone" because it has a speaker portion hinged to the telephone body that "flips" away from the body to expose the keypad to access. A rechargeable battery module interconnects to the rear of the telephone body and provides power for the telephone. The latter type of telephone has no hinged speaker component, but has the speaker built into the body portion of the telephone. However, it also uses a detachable battery module for powering the telephone.

These two cellular telephones, as well as all other cellular telephones in the marketplace contain a variety of programmable parameters that define the operation of cellular telephones. These parameters include, for example, the electronic serial number ("ESN") of the telephone, the telephone number (referred to as a mobile identification number or "MIN") assigned to the cellular telephone, the system identification number ("SIN") of the cellular system to which the user subscribes, confidential user codes and other important information. This information is held within a memory area of the cellular telephone that is known as a number assignment module ("NAM").

When a customer initially subscribes to a cellular service, this information is programmed into the NAM of the telephone at the point of purchase by the vendor. In order to program or read this information, the cellular telephone must be set to a test mode for access to the NAM. This information is stored in a memory of the telephone and any subsequent changes to this information is effected by accessing the NAM of the cellular telephone.

Unfortunately, the increase in popularity and reduction of cost in cellular telephones have also made such telephones attractive to thieves. Stolen telephones may be identified when recovered by law enforcement officials by placing the telephones into a test mode in the same manner as a telephone vendor does at the point of purchase to read the information contained in the NAM, such as the ESN, the MIN and other information.

The easiest manner to set a cellular telephone into a test mode is by grounding a manual test pin located on the telephone main body in opposition to its battery module. Presently, this task requires removing the battery module and placing the telephone body into a test receptacle or block having a regulated power supply and a momentary contact switch, or using a wire jumper to ground the manual test pin while applying power to the portable telephone. The telephone is then powered up by pressing its power key and a selected key of the keypad, such as the "#" key, is pressed to place the telephone into what is known as the manual test mode. Although effective, these test receptacles are expensive and cumbersome, while the wire jumper method is crude and requires the use of two hands which may preclude the tester from applying power to the telephone to enable its test mode. Neither of these two known manners of programming lend themselves to use by individual telephone owners or law enforcement officials.

Therefore, a need exists for a simple and inexpensive grounding mechanism that permits quick, one-handed access to the test mode of a cellular telephone for NAM programming and reading. The present invention is directed to a grounding assembly for portable cellular telephones that overcomes the aforementioned disadvantages and has a simple and low cost structure which can be utilized as a replacement battery module for cellular telephones.

SUMMARY OF THE INVENTION

It is therefore a general object of the present invention to provide an assembly for a cellular telephone that permits easy, one-handed manner of switching the mode of operation of the telephone from an operational mode to a test mode.

It is another object of the present invention to provide a grounding assembly for a cellular telephone that is integrated into a battery module adapted to engage a body portion of the cellular telephone in opposition to a manual test pin of the telephone body portion.

It is still another object of the present invention to provide an assembly which replaces the battery module on a cellular telephone, the assembly having a replacement battery module with a grounding assembly incorporated therewith in opposition to a manual test pin of the cellular telephone, the grounding assembly permitting access by a user to the number assignment module NAM of the cellular telephone for reading and/or programming information of the cellular telephone NAM.

A still further object of the present invention is to provide a grounding assembly in a cellular telephone battery module, the grounding assembly being disposed in opposition to a manual test pin of a cellular telephone, the grounding assembly including a grounding element protruding from the rear of the battery module biased out of contact with the manual test pin. the grounding element being further disposed on the rear of the telephone proximate to the telephone power switch, thereby enabling one-handed operation of the grounding element into contact with telephone manual test pin to place the telephone into a test mode of operation.

The present invention accomplishes the aforementioned objects by providing a grounding assembly disposed in a replacement battery module, the battery module being engageable with the rear of a cellular telephone body portion. The grounding assembly is held by the battery module in a location that is generally opposite the power and test contacts of the telephone body portion. The grounding assembly includes a manually actuatable grounding element that may be manipulated by a user into and out of contact with the telephone body portion manual test pin to switch the telephone from a conversational operating mode in which communication is enabled to a test/programming mode, wherein operational information may be accessed from and input into the telephone electronics.

In another principal aspect of the present invention, the grounding assembly includes a conductive bracket press fit in a recess of the housing of a battery module, a manually operable grounding element supported within the recess by a biasing spring moveable from a location exterior of the battery module housing into and out contact with the telephone body portion manual test pin. The conductive bracket is interconnected to a negative power terminal of the battery module and depression of the grounding element causes it to short the battery module negative terminal to the telephone body portion test pin, and when the telephone power switch is depressed, the telephone is placed into a test mode wherein information may be accessed from or input into the NAM of the cellular telephone.

These and other objects, features and advantages of the present invention will become apparent from the following detailed description, taken in conjunction with the accompanying drawings, wherein like reference numerals refer to like parts.

BRIEF DESCRIPTION OF THE DRAWINGS

In the course of this detailed description, reference will be made to the accompanying drawings in which:

FIG. 2 is a perspective view of the rear side of the portable cellular telephone of FIG. 1;

FIG. 3 is an exploded view, partially in section, of the portable cellular telephone of FIG. 2 illustrating the components of the grounding assembly of the present invention;

FIG. 4 is a cross-sectional view of the portable cellular telephone of FIG. 1, taken generally along lines A—A thereof, illustrating the grounding assembly in place within the battery module in a normal condition;

FIG. 5 is the same view as FIG. 4, but illustrating the grounding assembly in an actuated condition for activating the portable cellular telephone into a test mode; and, FIG. 6 is an enlarged detail view illustrating the structure of the grounding assembly used in the cellular telephone of FIG. 1.

DETAILED DESCRIPTION OF THE INVENTION

Figure 1:
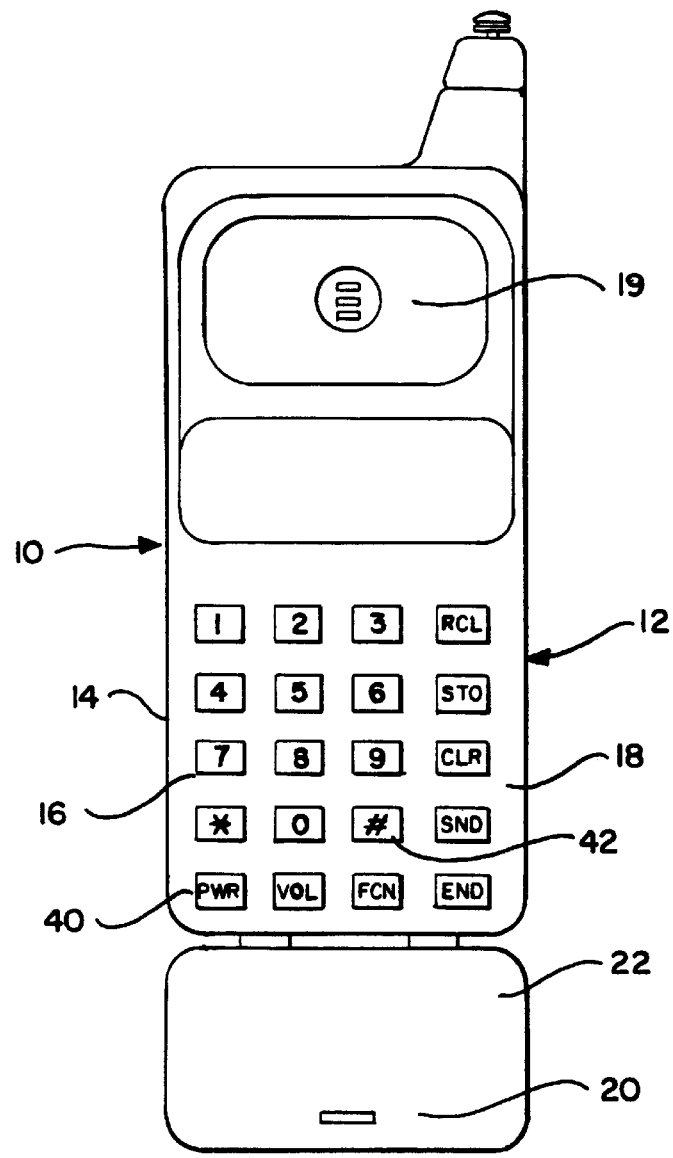
FIG. 1 is a perspective view of a known style portable cellular telephone incorporating a battery module having a grounding assembly constructed in accordance with the principles of the present invention.
Figure 6:
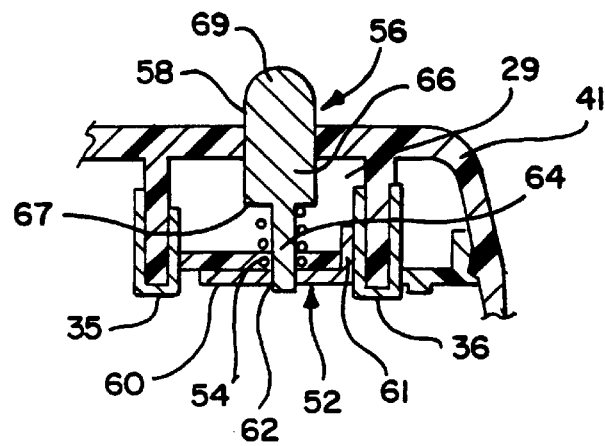

A portable cellular telephone is shown generally at 10 in FIG. 1. The telephone 10 illustrated is a Motorola "Micro-Tac" and is commonly referred to as a "flip-phone". Such a cellular telephone has a telephone body portion 12 which encloses the electronics (not shown) within an exterior plastic housing 14. A keypad 16 is located on the front face 18 of the telephone 10, along with an earpiece 19 and a mouthpiece 20. The mouthpiece 20 is disposed within a hinged cover 22 that rotates over and away from the keypad 16. The telephone 10 includes a battery module 24 which slidably engages the rear face 26 of the telephone body portion 12. The battery module 24 has a plastic exterior housing 41 that houses either a rechargeable battery or disposable battery 23 therein to supply power to the cellular telephone 10 for operation and may be detached therefrom for recharging purposes.

Although the following detailed description of the present invention will be made in the context of use with the cellular "flip-phone" telephone 10 illustrated, it will be understood that the present invention may be used on any variety of portable cellular telephones that utilize a detachable battery module 24 and the depiction in the Figures is for exemplary purposes. In the telephone 10 illustrated, as with other portable cellular telephones, the battery module 24 engages the cellular telephone body portion 12 by way of tracks or rails 28 that permit the battery module 24 to be slid onto the telephone body portion rear face 26.

The cellular telephone 10 has a plurality of conductive terminals 30, 31, & 32 disposed in the telephone body portion 10 and opening on the rear face 26 thereof. These terminals 30–32 will typically include two power contacts 30, 32 that oppose and they make contact with corresponding positive and negative terminals 35, 36 formed in the battery module attachment face 27 when the battery module 24 is attached to the telephone body portion 10. The center terminal 31 of the telephone terminals is illustrated as a grounding terminal, which is also referred to in the art as a manual test pin. This test pin terminal 31, when shorted and when the telephone power key 40 is activated, places the cellular telephone 10 into a test mode whereby the number assignment module NAM may be accessed.

The two power contacts 30, 32 are seated in channels 13 formed in the telephone body portion 12 and are formed from a flexible and conductive material, such as copper, silver, gold or other similar metal. The power terminals 30, 32 preferably extend slightly outwardly from the channels 13 and above the telephone body portion rear face 26 and the manual test pin terminal 31 so they make reliable contact with the battery power terminals 35, 36 when the battery module 24 is applied to the telephone body portion 12.

Turning now to FIG. 3, a grounding assembly constructed in accordance with the principles of the present invention is illustrated generally at 50. The grounding assembly 50 includes three basic components: a contact bracket 52, a spring 54 and a manually operable actuating member 56, illustrated in the Figures as a plunger pin 58. The grounding assembly 50 is positioned within the housing 25 of the battery module 24 such that it is aligned with the telephone terminals 30–32 when the battery module 24 is placed on the rear face 26 of the telephone body portion 12.

FIGS. 4 & 5 depict the grounding assembly 50 in place within a recess 29 of the housing 25 of the battery module 24 and best illustrate the manner of operation of the grounding assembly 50. The contact bracket 52 of the grounding assembly 50 is preferably has a right-angle configuration having a distinct base portion 60 and an adjoining vertical portion 61 that abuts and electrically contacts the negative terminal 36 of the battery module 24. The contact bracket 52 may be press-fit into the battery module housing recess 29 and retained therein by a suitable means, such as detents formed in the walls of the recess 29.

The base portion 60 of the contact bracket 52 has an opening 62 disposed therein which receives the actuating member 56. The actuating member plunger pin 58 includes a shaft 64 having a diameter approximately equal to that of the opening 62 and a projecting body portion 66 having a diameter larger than that of the shaft 64. This difference in diameter preferably defines an annular shoulder 67 on the body portion 66. The body portion 66 of the actuating member 56 has a length long enough to permit its head portion 69 to protrude through a bore 70 in the battery module 24 to a point exterior of the battery module housing 24.

The spring 54 shown in the embodiment illustrated takes the form of a compression spring and is seated between the plunger pin body shoulder 67 and the base portion 60 of the contact bracket 52. As a compression spring 54, it applies an upward force against the annular shoulder 67 to bias the plunger pin 58 out of contact with the grounding/manual test pin terminal 31 of the telephone body portion 12 as illustrated effectively in FIG. 4. This force is overcome by a user pressing the plunger pin head 69 with a finger or thumb as illustrated in FIG. 5. When depressed by a user, the plunger pin shaft 64 passes through the opening 62 and into contact with the opposing telephone body grounding/manual test pin terminal 31 to establish a ground path P to short the battery module negative power terminal 36 to the contact bracket vertical portion 61 which abuts the negative terminal 36, through the bracket base portion 60, the spring 54 and the plunger pin shaft 64 to the grounding/manual test pin terminal 31 of the telephone.

When so shorted or grounded, the cellular telephone 10 may be placed into a test mode wherein the NAM may be accessed and information contained therein read, programmed or reprogrammed by the user while not using a special test receptacle or a jumper method. Access to the NAM is effected from exterior of the telephone. As mentioned above in the Background and Summary section, the present invention provides a simple and inexpensive grounding mechanism (utilizing only three separate components) that permits quick, one-handed entry to the test mode of a cellular telephone for access to the NAM of the telephone for programming and display of its information. In this regard, it will be noted that in the preferred embodiment, the grounding assembly will be advantageously located on the rear of the telephone battery module 24 in an area that is aligned with the telephone power key 40, thereby enabling a user to enter the telephone's test mode with one hand.

In such an instance, the user holds the telephone 10 near its bottom and depresses the actuating member 56 with his index or middle finger. The power key 40 may then be depressed with the user's thumb as well as any particular test mode trigger key, such as the "#" key 42 because the grounding assembly 50, and the plunger pin 58 thereof are generally aligned with the power key 40 of the telephone 10 along an imaginary line L. Once the test mode has been entered, the user may access the NAM and display information contained therein, or program or reprogram the telephone by entering new NAM information by using the telephone keypad 16. The grounding assembly may be incorporated into any battery module for any existing cellular telephone so that replacement battery modules with an integrated grounding assembly may be offered to cellular telephone consumers. Additionally, law enforcement officials may carry replacement battery modules with grounding assemblies constructed in accordance with the principles of the present invention and attach them to stolen cellular telephones that are confiscated from criminal elements to access their NAM's and obtain the necessary number information that will permit them to identify the rightful owner of the cellular telephone.

It will be understood that the embodiment of the present invention which has been described herein is merely illustrative of some of applications of the principles of the present invention. Various modifications may be made by those skilled in the art, such as different battery module configurations, the use of a tension spring rather than a compression spring as a biasing means and other modifications without departing from the true spirit and scope of the invention.

We claim:

1. In a portable cellular telephone of the type having a telephone body portion, the telephone body portion having a front face containing a keypad and a rear face having means for engaging a battery module for supplying power to the telephone body portion, the telephone body portion rear face further having a plurality of conductive terminals disposed thereon, at least two of said terminals being power terminals and another of said terminals being a manual test terminal, said cellular telephone further having a number assignment module (NAM) that stores data about said cellular telephone within said cellular telephone and said cellular telephone also having at least two different operational modes, one of the operational modes being a conversational mode for conveying and receiving conversations and another of said modes being a test mode by which a user may access said NAM, the improvement comprising: a battery module with a grounding assembly incorporated therewith for accessing said NAM from exterior of said telephone body portion, the battery module having means for engaging said telephone body portion rear face, the grounding assembly being disposed within said battery module in opposition to said telephone body portion rear face conductive terminals; a conductive bracket disposed in contact with a power terminal of said battery module and extending therefrom into alignment with said telephone body portion manual test terminal, a manually operable grounding element in electrical contact with said conductive bracket, the grounding element projecting part way through said battery module and also being aligned in opposition to said telephone body portion manual test terminal; said conductive bracket providing electrical contact between said battery module power terminal and said grounding element; and, biasing means for applying a biasing force to said grounding element to urge said grounding element into a first operative position away from contact with said telephone body portion manual test terminal, said biasing force being overcome by a user pressing said grounding element from exterior of said cellular telephone into a second operative position wherein said grounding element is urged into electrical contact with both said conductive bracket and said telephone body portion manual test terminal, to thereby ground said telephone body portion manual test terminal and place said cellular telephone into said test mode wherein said NAM is accessible.

2. The portable cellular telephone of claim 1, wherein said grounding element includes an elongated cylindrical plunger, the plunger having a body portion partially held within said battery module and partially projecting outwardly therefrom, said plunger further having a shaft portion that extends through said conductive bracket into opposition with said telephone body portion manual test terminal.

3. The portable cellular telephone of claim 2, wherein said biasing means is disposed on said plunger shaft portion.

4. The portable cellular telephone of claim 3, wherein said biasing means includes a coil spring.

5. The portable cellular telephone of claim 4, wherein said plunger body portion and shaft portion are separated by an annular shoulder portion, and the coil spring is a compression spring disposed on said plunger shaft portion between and extends between said conductive bracket and said plunger annular shoulder portion.

6. The portable cellular telephone of claim 5, wherein said coil spring exerts a biasing force on said plunger forcing said plunger to project partially out of said battery module.

7. The portable cellular telephone of claim 1, wherein said battery module includes a recess which houses a portion of said grounding assembly.

8. The portable cellular telephone of claim 1, wherein said battery module includes a negative power terminal and a positive power terminal and said conductive bracket contacts said battery module negative power terminal.

9. The portable cellular telephone of claim 1, wherein said battery module includes a negative power terminal and a positive power terminal and said grounding element is disposed generally between said battery module power terminals and extends generally upright therefrom, said conductive bracket contacting said battery module negative power terminal.

10. The portable cellular telephone of claim 1, wherein said battery module includes a base face that opposes said telephone body rear face and said conductive bracket includes a flat base portion disposed on said battery module base face in opposition to said telephone body portion rear face and a contact portion that extends away from said bracket base portion at an angle thereof, the bracket contact portion abuttingly contacting said battery module power terminal.

11. The portable cellular telephone of claim 1, wherein said telephone body portion keypad includes a power key disposed therein proximate to a corner of said cellular telephone and said grounding assembly is disposed proximate to said corner of said cellular telephone and generally in alignment with said power key.

12. A battery module for powering a portable cellular telephone, wherein the cellular telephone includes a telephone body, the telephone body having a keypad on one face thereof, said telephone body having a base on another face thereof, the base including at least three conductive terminals disposed thereon, one of said conductive terminals defining a manual test pin for said cellular telephone and the other of said conductive terminals being power terminals for conveying battery power to said telephone body, the battery module comprising: means integrated therewith for accessing a test mode of said cellular telephone from exterior of said cellular telephone without removing said battery module therefrom, a housing that detachably engages said telephone body base, a battery enclosed within said housing, said test mode access means including a grounding assembly disposed in opposition to said telephone body base conductive terminals, the grounding assembly including a manually manipulatable grounding pin for shorting said battery of said battery module to said telephone body base manual test pin by making contact with said telephone body base manual test pin to thereby place said cellular telephone into said test mode, a portion of said grounding pin projecting from said battery module housing and being accessible from exterior of said battery module housing, the grounding pin being manipulatable along a path of motion between first and second operative positions, wherein in said first operative position, said grounding pin is biased away from contact with said telephone body base manual test pin, and in said second operative position, said grounding pin contacts said telephone body base manual test pin.

13. The portable cellular telephone battery module as defined in claim 12, wherein said battery module includes a pair of battery power terminals and said grounding assembly further includes a conductive bracket having an opening disposed therein and aligned in opposition with said telephone body base manual test pin, the bracket further contacting one of said battery power terminals, said grounding pin being received within and contacting said bracket opening, whereby said bracket provides a conductive path between said battery module one power terminal and said grounding pin.

14. The portable cellular telephone battery module as defined in claim 12, wherein said grounding assembly includes a conductive support having an opening that receives a portion of said grounding pin and supports said grounding pin in opposition to said telephone body base manual test pin, said grounding assembly further including a biasing spring that biases said grounding pin into said first operative position.

15. The portable cellular telephone battery module as defined in claim 12, further including a biasing spring that biases said grounding pin into said first operative position.

16. The portable cellular telephone battery module as defined in claim 15, wherein said grounding pin includes a body portion and a shaft portion, said grounding pin body and shaft portions being separated by an annular shoulder portion, said biasing spring being disposed on said grounding pin shaft portion and extending between said grounding pin shoulder portion and said battery module housing.

17. The portable cellular telephone battery module as defined in claim 15, wherein said battery includes two power terminals disposed thereon opposite said telephone body conductive power terminals, a conductive element defining a base plate of said grounding assembly that extends from one of said battery power terminals into the path of motion of said grounding element, and said base plate electrically contacting said grounding element when said grounding element is in said second operative position.

18. The portable cellular telephone battery module as defined in claim 12, wherein said cellular telephone has a power key located in said telephone body one face proximate to corner of said telephone body and said grounding pin is positioned in said battery module on a face of said telephone opposite said one face and aligned with said power key along an imaginary line passing through said cellular telephone.

19. In a portable cellular telephone of the type having a telephone body with a front surface having a keypad thereon and a rear surface having a manual test pin and power terminals disposed thereon, and a battery module mounted onto the rear surface of the telephone body for supplying power to the telephone for operation thereof, the battery module having power terminals disposed thereon in opposition to said telephone body power terminals, the telephone having at least two different modes of operation, one of the operating modes being a conversational mode for communicating with another telephone and the other of said operating modes being a programming mode, wherein operational data may be programmed into said telephone via said keypad, the improvement comprising: means integrated with said battery module for manually switching between said two modes of operation from a point exterior of said battery module without removing said battery module from said telephone body, said telephone mode manual switching means being disposed on said battery module in opposition to said test pin of said telephone, and operable between two positions, wherein in a first of said two positions, said telephone mode manual switching means is biased away from and out of contact with said telephone body manual test pin and wherein in a second of said two positions, said telephone module manual switching means is manipulatable toward and into contact with said telephone body manual test pin to form a shorting path between one of said battery module power terminals and said test pin.

20. The portable cellular telephone defined in claim 19, wherein said battery module one power terminal is a negative power terminal.

21. The portable cellular telephone as defined in claim 19, wherein said manual switching means includes shorting element slidably held within said battery module, a conductive bracket which contacts said shorting element when said telephone body manual switching means is in said second position.

* * * * *